United States Patent [19]

John, Jr.

[11] 4,117,333
[45] Sep. 26, 1978

[54] NUCLEAR FUEL ELEMENT LEAK DETECTION SYSTEM

[75] Inventor: Clarence D. John, Jr., Penn Hills, Pa.

[73] Assignee: Westinghouse Electric Corp., Pittsburgh, Pa.

[21] Appl. No.: 792,288

[22] Filed: Apr. 29, 1977

[51] Int. Cl.² .................. G01T 1/185; G01M 3/04; G01T 3/00

[52] U.S. Cl. .................................. 250/380; 73/40.7; 250/390

[58] Field of Search ............... 250/364, 380, 390, 391, 250/392; 49/68; 73/40.7

[56] References Cited
U.S. PATENT DOCUMENTS 3,711,993  1/1973  Liesch et al. ........................ 49/68

Primary Examiner—Alfred E. Smith
Assistant Examiner—Janice A. Howell
Attorney, Agent, or Firm—L. A. DePaul; Z. L. Dermer

[57] ABSTRACT

A leak detection system integral with a wall of a building used to fabricate nuclear fuel elements for detecting radiation leakage from the nuclear fuel elements as the fuel elements exit the building. The leak detecting system comprises a shielded compartment constructed to withstand environmental hazards extending into a similarly constructed building and having sealed doors on both ends along with leak detecting apparatus connected to the compartment. The leak detecting system provides a system for removing a nuclear fuel element from its fabrication building while testing for radiation leaks in the fuel element.

10 Claims, 3 Drawing Figures

NUCLEAR FUEL ELEMENT LEAK DETECTION SYSTEM

BACKGROUND OF THE INVENTION

This invention relates to apparatus for detecting leaks in nuclear fuel elements and particularly to leak detection apparatus having a gas detection mechanism.

In many nuclear reactor designs, the reactor vessel has an inlet and an outlet for circulation of a coolant in heat transfer relationship with a core contained therein that produces heat. The core comprises an array or arrays of fuel assemblies which contain fuel elements. The fuel element is generally a cylindrical metallic sheath sealed at both ends containing nuclear fuel and internally pressurized with a gas such as helium. The nuclear fuel which may be, for example, ceramic fuel pellets of a uranium compound is stacked in the fuel elements. During reactor operation, the nuclear fuel pellets fission thereby generating heat in a manner well known in the art. The reactor coolant absorbs the heat while circulating through the core thereby cooling the fuel elements of the core and heating the coolant. Of course, the heated coolant may then be used to produce electricity in a conventional manner.

There are several methods known in the art for loading uranium fuel pellets into the cylindrical metallic sheath for use in a light water reactor. One such method comprises simply placing the fuel pellets in the metallic sheath by hand. This method is possible because non-irradiated uranium fuel does not pose serious radiological problems to working personnel. However, when the nuclear fuel utilized is of a more toxic nature such as plutonium or a reprocessed uranium compound, then increased safeguards must be employed to prevent releasing radioactive contaminants to the atmosphere and to prevent overexposing working personnel. When such toxic fuel is employed, it is known in the art to use glove box handling techniques to load the fuel pellets into the metallic sheath. Furthermore, when such toxic fuel is used the entire fabrication building must be constructed to strict design requirements that enable the building to withstand environmental hazards without releasing airborne contaminants or other radiological contaminants from the building. Such environmental hazards that the building must withstand include seismic disturbances, high wind loads, overpressure loads, and missiles that become airborne due to high winds.

In addition to being able to withstand environmental disturbances, the fabrication building must be constructed with a passageway to enable the completed fuel element to be tested for leaks and removed from the building without releasing contaminants to the atmosphere. The ability to test fuel elements for leaks as the fuel elements exit the building increases the probability that no leaks will have developed between the time of testing and exiting the building, which minimizes the risk of releasing contaminants to the atmosphere by means of a defective fuel element.

An example of an arrangement for transferring nuclear fuel elements through the walls of a nuclear installation is described in U.S. Pat. No. 3,711,993 to J. Liesch et al. issued Jan. 23, 1973. The Liesch patent disclosed a cylindrical chamber disposed in an isolation wall between a contaminated and an uncontaminated area for providing a passageway therebetween. The chamber is enclosed between a pair of shutters with variable apertures that allow the passage of a nuclear fuel element therethrough. The chamber may be flushed or purged with a gas so as to entrain contaminated particles in the gas which may then be conducted through a filter located remote from the chamber thereby trapping the contaminated particles in the filter. The patent to Liesch indicates that such a filter may be of the electrostatic or activated carbon type. While the Liesch patent describes a particular arrangement for transferring a nuclear fuel element through a wall of a nuclear installation, it does not solve the problem of testing the fuel element for leaks before removing the fuel element from a structure capable of withstanding environmental hazards.

SUMMARY OF THE INVENTION

A leak detection system integral with a wall of a building used do fabricate nuclear fuel elements for detecting radiation leakage from the nuclear fuel elements as the fuel elements exit the building. The leak detection system comprises a radiation shielded compartment constructed to withstand environmental hazards extending into a similarly constructed building and having sealable doors on both ends along with leak detecting apparatus connected to the compartment. The leak detecting apparatus may comprise a vacuum source and a particle detecting mechanism connected to the compartment. When the fuel element fabrication has been completed within the fabrication building, the compartment's first door located inside the fabrication building is opened while the second door located on the outside of the fabrication building remains sealed. The fuel element is then placed totally within the compartment and the first door is sealed closed. The vacuum source then draws a vacuum in the compartment and the particle detecting mechanism is activated. Since gas is used to internally pressurize the fuel elements, should a fuel element have a leak the gas would leak into the evacuated compartment and be detected by the particle detecting mechanism. The defective fuel element may then be withdrawn from the compartment and back into the fabrication building through the first door opening. Fuel elements having no leaks proceed through the second door opening of the compartment and out of the structure.

BRIEF DESCRIPTION OF THE DRAWINGS

While the specification concludes with claims specifically pointing out and distinctly claiming the subject matter of the invention, it is believed the invention will be better understood from the following description taken in conjunction with the accompanying drawings, wherein:

FIG. 3 is a view along line III—III of FIG. 1.

DESCRIPTION OF THE PREFERRED EMBODIMENT

In nuclear fuel element fabrication facilities that employ nuclear fuel requiring increased safeguards against its release to the atmosphere, it is important to be able to test each fuel element for possible radiological leaks as the fuel elements exit the fabrication building. Generally, these safeguards mandate that the leak detecting apparatus, along with the fabrication building itself, be constructed to withstand environmental hazards to insure against the release of contaminants to the atmosphere. The invention described herein provides an apparatus for so testing the fuel elements.

Figure 1:
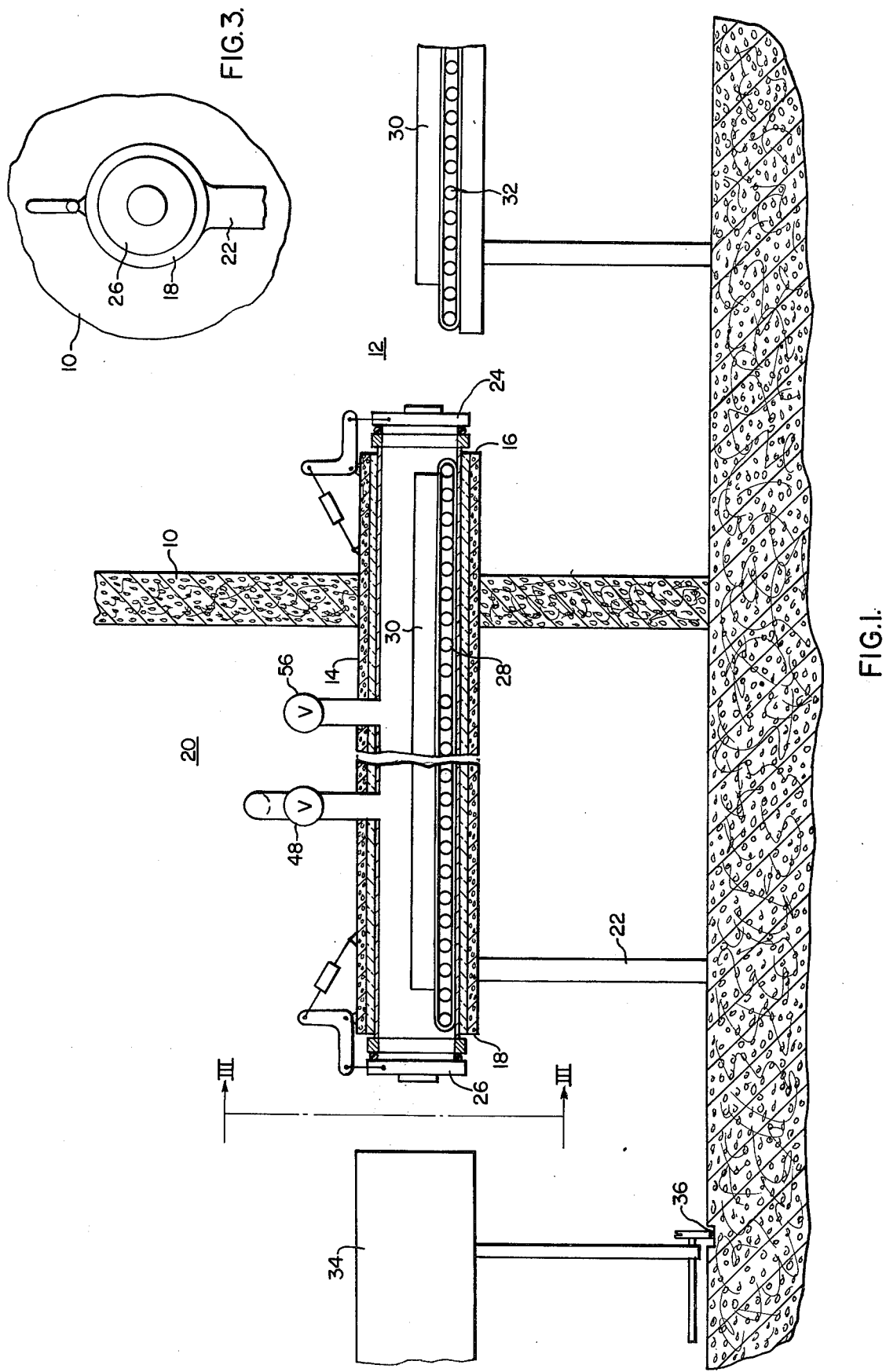
FIG. 1 is a cross-sectional view in elevation of the leak detection system.

Referring to FIG. 1, a nuclear fuel element fabrication building comprises radiological protective walls 10 that encloses a fuel element fabrication area 12. Since fabrication area 12 may contain toxic fuels such as plutonium or reprocessed uranium fuels, walls 10 are constructed to be able to withstand environmental hazards such as seismic disturbances, high wind loads, overpressure loads, and missiles that become airborne due to high winds without releasing airborne contaminants or other radiological contaminants from fabrication area 12. A radiologically shielded first compartment 14 that is also constructed to withstand environmental hazards and may be constructed of thick-walled stainless steel pipe with a smooth internal finish is disposed in wall 10. First compartment 14 has a first end 16 which is located in fabrication area 12 and a second end 18 which is located outside fabrication area 12 in a multi-purpose room 20. First end 16 is supported by wall 10 while second end 18 may be supported from the ground by support 22 so as to arrange first compartment 14 in a plane substantially parallel to the floors of fabrication area 12 and multi-purpose room 20. First end 16 is equipped with a first door 24 which may be chosen from those well known in the art and is capable of creating an air-tight seal around first end 16 when closed. First door 24 is also equipped with a remotely operable door opener chosen from those well known in the art for opening and closing first door 24 upon appropriate command. Likewise, second end 18 has a second door 26 that is capable of creating an air-tight seal around second end 18 and also has a remotely operable door opener for opening and closing second door 26. When first door 24 and second door 26 are both closed the inside of first compartment 14 is isolated from the atmosphere in fabrication area 12 and the amosphere in multipurpose room 20. First compartment 14 has a first conveyor 28 mounted therein for carrying nuclear fuel elements 30. First compartment 14 is constructed to be of a length to completely contain a fuel element 30 therein when first door 24 and second door 26 are both closed. Fabrication area 12 contains a second conveyor 32 located on the same horizontal plane as first conveyor 28 and in colinear alignment therewith. Second conveyor 32 does not abut first end 16 to enable first door 24 to be operated, yet is spaced close enough to first end 16 to enable second conveyor 32 to advance a fuel element 30 onto first conveyor 28 when first door 24 is open. Similarly, a radiation shielded cart 34 may be positioned near second door 26 on tracks 36 to carry the fuel elements 30 that are transferred through first compartment 14.

Figure 2:
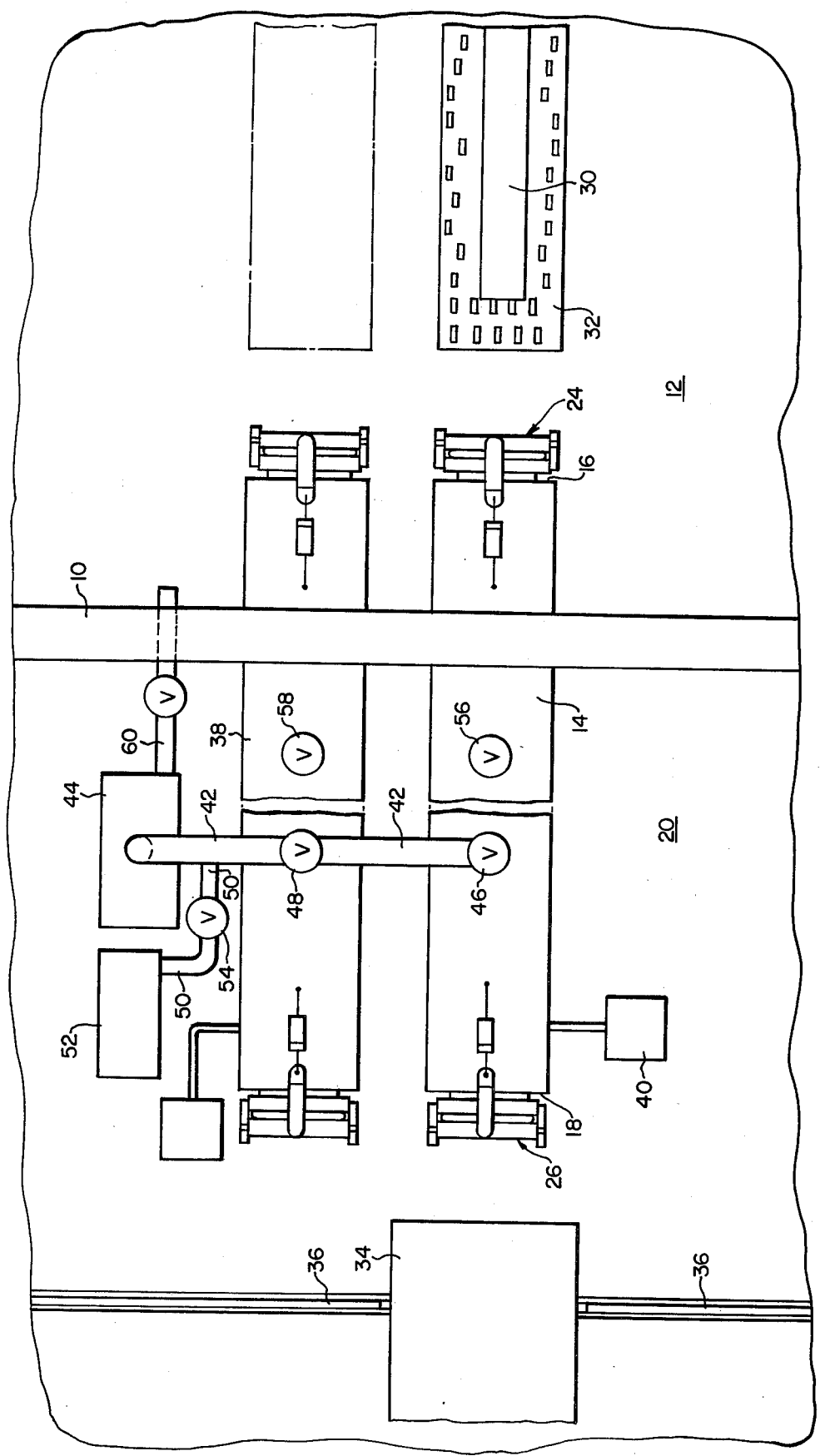
FIG. 2 is a plan view of the leak detection system.

Referring now to FIGS. 2 and 3, in addition to first compartment 14 a second compartment 38 which is similar to first compartment 14 is arranged adjacent to first compartment 14 to provide dual capability for transferring fuel elements. A motor 40 is connected to first conveyor 28 through standard seals (not shown) located in the walls of first compartment 14. Motor 40 serves to drive first conveyor 28 when activated. A similar motor is also connected to second compartment 38. A first conduit 42 connects the inside of first compartment 14 and the inside of second compartment 38 to a vacuum source 44. Vacuum source 44 which is capable of establishing a pressure of $10^{-6}$ microns mercury may be chosen from those well known in the art and arranged so that when first door 24 and second door 26 are closed a vacuum may be drawn in first compartment 14. Of course, the vacuum could also be drawn on second compartment 38. A first valve 46 which may be chosen from those well known in the art is disposed in first conduit 42 near first compartment 14 and is capable of isolating the remainder of first conduit 42 from first compartment 14. Similarly, a second valve 48 is disposed in first conduit 42 near second compartment 38 to selectively isolate second compartment 38. A second conduit 50 connects first conduits 42 to a leak detector 52 while a third valve 54 is disposed in second conduit 50 to provide the capability of isolating leak detector 52 from first conduit 42. Leak detector 52 may be a gas detector such as a helium leak detector or a mass spectrometer. When leak detector 52 is chosen to be a mass spectrometer, traces of particles other than gases may be detected in first compartment 14. When first valve 46 and third valve 54 are open and when vacuum source 44 has drawn a vacuum in first compartment 14, leak detector 52 is capable of detecting traces of gases of about $10^{-8}$ cc per second. Since most nuclear fuel elements are internally pressurized with a gas such as helium, when placed in first compartment 14 leaks on the order of $10^{-8}$ cc per second of helium are detectable by leak detector 52.

Nuclear fuel element fabrication which may include loading nuclear fuel pellets into a cylindrical metallic sheath, internally pressurizing the metallic sheath with a gas such as helium, and sealing both ends of the metallic sheath with end plugs may be performed in a conventional manner within a radiologically protective building. When the nuclear fuel pellets are composed of toxic fuels such as plutonium or reprocessed uranium, extra care must be taken to prevent airborne contaiminants from escaping from the fabrication building. For this reason walls 10 are constructed to withstand environmental hazards so that airborne contaminants will not be released from fabrication area 12 even under severe conditions. When the fuel element 30 has been completely assembled it may be moved from the fabrication building to another building such as multi-purpose room 20 without releasing contamination to the atmosphere because the nuclear fuel is completely sealed within the fuel element's metallic sheath. However, care must be taken to avoid releasing air from fabrication area 12 or from removing a defective fuel element that may release contamination. Completed nuclear fuel elements 30 may be moved from fabrication area 12 to multi-purpose room 20 by means of first compartment 14 without releasing air from fabrication area 12. Fuel elements 30 may also be tested for leaks in first compartment 14 so that no defective fuel elements will be removed from fabrication area 12.

In addition, a fourth valve 56 may be connected to first compartment 14 and a fifth valve 58 may be connected to second compartment 38 to provide a venting system for repressurizing the compartments so that the doors may be more easily opened. Also, an exhaust system 60 may be connected between vacuum source 44 and fabrication area 12 so that the contaminants from the compartments may be exhausted into fabrication area 12.

OPERATION

One or more completed fuel elements 30 are moved by second conveyor 32 through the opening of first door 24 and into first compartment 14 while second door 26 remains closed. It should be noted that first door 24 and second door 26 are not normally open at the same time so that contaminated air in fabrication area 12 does not pass into multi-purpose room 20. First conveyor 28 aids in moving fuel elements 30 completely into first compartment 14 so that first door 24 may be closed thereby sealing fuel elements 30 in first compartment 14. When first door 24 has thus been sealed closed, first valve 46 is opened while second valve 48 and third valve 54 remain closed so as to place vacuum source 44 in fluid communication with first compartment 14 by means of first conduit 42. Vacuum source 44 is then activated which causes first compartment 14 to be evacuated. Third valve 54 is then opened and leak detector 52 is activated. With third valve 54 open, leak detector 52 is in fluid communication with first compartment 14 by means of second conduit 50 and first conduit 42. Since fuel elements 30 have been internally pressurized with a gas such as helium, should fuel elements 30 have leaks therein minute traces of the gas would be detected by leak detector 52 which would cause an alarm to be activated. Of course, when leak detector 52 is chosen to be a mass spectrometer or other similar device, leak detector 52 is capable of detecting particles other than gases such as uranium or plutonium particles that may have leaked from the fuel element. If the alarm is so activated, the above procedure would be reversed and the fuel elements moved back to fabrication area 12 through first door 24 without contaminants being released to multi-purpose room 20. By repeating the above-described procedure with smaller batches of the same fuel elements 30, the defective fuel element can be determined by a process of elimination. Of course, if only one fuel is being transported, the defective fuel element is immediately determined.

If no fuel elements are defective, first valve 46, and third valve 54 are closed while leak detector 52 and vacuum source 44 are deactivated. At this point, first compartment 14 contains no airborne contaminants because it has been evacuated by vacuum source 44. Second door 26 may then be opened and first conveyor 28 activated. First conveyor 28 then moves fuel elements 30 into shielded cart 34 where they may be further transported. During the process air is not released from fabrication area 12 to multi-purpose room 20. Of course, second compartment 38 may be used as an alternative or in conjunction with first compartment 14 in a manner similar to first compartment 14. Therefore, the invention provides a vacuum source and a leak detecting mechanism constructed to withstand environmental hazards and integral with a nuclear fuel element fabrication building similarly constructed to withstand environmental hazards for detecting leaks in nuclear fuel elements as the fuel elements are removed from the fabrication building.

I claim as my invention:

1. A method for removing nuclear fuel elements from a fabrication building while testing the fuel elements for leaks and without releasing contaminants from said fabrication building comprising:
   opening a first door to a compartment extending into said fabrication building;
   completely loading said fuel element through the opening of said first door and into said compartment;
   closing and sealing said first door thereby completely sealing said fuel element in said compartment;
   evacuating said compartment;
   activating a particle detecting mechanism connected to said first compartment for detecting the presence therein of particles that have emanated from said fuel element;
   opening a second door to said compartment if said particle detecting mechanism does not detect gas and removing said fuel element through the opening of said second door and from said compartment without releasing contaminants from said fabrication building; and
   opening said first door to said compartment if said particle detecting mechanism does detect gas and removing said fuel elements through said opening of said first door and from said compartment without releasing contaminants from said fabrication building.

2. The method according to claim 1 wherein said step of activating said particle detecting mechanism includes activating a gas detecting mechanism.

3. The method according to claim 2 wherein said step of activating said gas detecting mechanism includes activating a helium detecting mechanism.

4. The method according to claim 1 wherein said step of activating said particle detecting mechanism includes activating a mass spectrometer connected to said compartment.

5. The method according to claim 1 wherein said loading said fuel elements includes loading said fuel elements by means of a conveyor.

6. A leak detection system disposed in a wall of a nuclear fuel element fabrication structure comprising:
   a compartment disposed in the wall of the fabrication structure having a first end extending into the fabrication structure and having a second end extending outside the fabrication structure for receiving completed nuclear fuel elements;
   a sealable first door attached to said first end for selectively sealing said first end;
   a sealable second door attached to said second end for selectively sealing said second end;
   evacuating means connected to said compartment for establishing a vacuum in said compartment; and,
   leak detecting means connected to said compartment for detecting traces of particles in said compartment that have emanated from said nuclear fuel element when said evacuating means is activated.

7. The system according to claim 6 wherein said leak detecting means comprises a gas detecting mechanism for detecting traces of gas emanating from said nuclear fuel element.

8. The system according to claim 6 wherein said leak detecting means comprises a mass spectrometer for detecting traces of particles emanating from said nuclear fuel element.

9. The system according to claim 6 wherein said compartment comprises:
   a radiologically shielded structure capable of withstanding environmental hazards; and,
   first conveyor means disposed therein for transporting said nuclear fuel elements.

10. The system according to claim 9 wherein said system further comprises:
    second conveyor means disposed in the fabrication structure for transporting the nuclear fuel elements into said compartment.

* * * * *